US009804388B2

(12) United States Patent
Klebanov et al.

(10) Patent No.: US 9,804,388 B2
(45) Date of Patent: Oct. 31, 2017

(54) METHOD FOR COMPENSATING OPTICAL ABERRATIONS WITH A DEFORMABLE MIRROR

(71) Applicants: Samara State Technical University, Samara (RU); Autonomous Noncommercial Organization "Cluster Engineering Center of Samara Region"/ANO "CEC SR", Samara (RU)

(72) Inventors: Iakov Klebanov, Samara (RU); Ravil Akhmetov, Samara (RU); Konstantin Polyakov, Samara (RU)

(73) Assignees: SAMARA STATE TECHNICAL UNIVERSITY/SSTU, Samara (RU); AUTONOMOUS NONCOMMERCIAL ORGANIZATION "CLUSTER ENGINEERING CENTER OF SAMARA REGION"/ANO "CEC SR", Samara (RU)

( * ) Notice: Subject to any disclaimer, the term of this patent is extended or adjusted under 35 U.S.C. 154(b) by 0 days.

(21) Appl. No.: 15/267,011

(22) Filed: Sep. 15, 2016

(65) Prior Publication Data

US 2017/0075112 A1    Mar. 16, 2017

(30) Foreign Application Priority Data

Sep. 15, 2015   (RU) ................................ 2015139306

(51) Int. Cl.
*G02B 26/08*    (2006.01)
*G02B 27/00*    (2006.01)
(Continued)

(52) U.S. Cl.
CPC ......... *G02B 27/0068* (2013.01); *G02B 7/181* (2013.01); *G02B 26/06* (2013.01); *G02B 26/0825* (2013.01); *G02B 27/0025* (2013.01)

(58) Field of Classification Search
CPC ............ G02B 27/0068; G02B 26/0825; G02B 26/0833; G02B 26/06; G02B 27/0025; G02B 7/181
(Continued)

(56) References Cited

U.S. PATENT DOCUMENTS

| 5,745,309 | A | * | 4/1998 | Salmon | ................. G02B 26/06 250/201.9 |
| 8,102,583 | B2 | | 1/2012 | Cook | ........................ 359/224.1 |
| 2008/0225229 | A1 | * | 9/2008 | Saito | ................... A61B 3/1015 351/206 |

OTHER PUBLICATIONS

Harvey J.E., Callahan G.M. Wavefront Error Compensation Capabilities of Multiactuator Deformable Mirrors // SPIE vol. 141, Adaptive Optical Components, 1978, p. 50-57.
(Continued)

*Primary Examiner* — James Phan
(74) *Attorney, Agent, or Firm* — Matthew A. Pequignot; Pequignot + Myers LLC (57) ABSTRACT

Method for compensating aberrations of an active optical system by a deformable mirror, comprising:
(a) formation of a matrix N, binding the optical system aberrations with the displacements of the surface of a deformable mirror, presented as a superposition of natural frequency modes of a mirror simulator having the same geometric shape and the same elasticity characteristics as the deformable mirror but having zero density except for concentrated masses attached at points corresponding to the places of action of the force actuators onto the deformable mirror;

(Continued)

(b) formation of the matrix M, binding the coefficients of the natural frequency modes of the mirror simulator with the forces or displacements of the force actuators that deform the mirror;

(c) generation of the matrix of forces or displacements for loading the deformable mirror on the basis of the aberration measurement, using the matrices N and M.

4 Claims, 7 Drawing Sheets

(51) Int. Cl.
 *G02B 7/18* (2006.01)
 *G02B 26/06* (2006.01)

(58) Field of Classification Search
 USPC .................................. 359/224.1, 846, 900
 See application file for complete search history.

(56) References Cited

OTHER PUBLICATIONS

Active Optics Correction of Thermal Distortion of a 1.8 Meter Mirror / E. Pearson, L. Stepp, J. Fox // Optical Engineering, 27(2), 115-122 (Feb. 1, 1988).
Lemaitre G.R. Astronomical Optics and Elasticity Theory // Active Optics Methods, Berlin, Heidelberg: Springer, 2009, 587 p.
Cho M.K. Active optics performance study of the primary mirror of the Gemini Telescopes Project // Optical Telescopes of Today and Tomorrow, SPIE vol. 2871, 1997, p. 272-290.

* cited by examiner

METHOD FOR COMPENSATING OPTICAL ABERRATIONS WITH A DEFORMABLE MIRROR

CROSS-REFERENCE TO RELATED APPLICATIONS

The present invention claims priority from Russian Patent Application No. 2015139306 filed Sep. 19, 2015, which is incorporated herein in its entirety by reference.

TECHNICAL FIELD

The present invention relates to methods providing for compensation of optical aberrations and more particularly to methods providing for compensation of optical aberrations with the use of a deformable mirror, and can find use in active optical systems devised for correcting aberrations of the wavefront of light beams.

BACKGROUND OF THE INVENTION

Active optics enable modification of the wavefront shape for compensating aberrations due to, for example, thermal distortion of optical elements, optical part manufacturing and mounting errors, the gravity action or the absence of gravity in the space that distorts the results of an adjustment on the ground.

It is known a method for compensation of optical aberrations (Harvey J. E., Callahan G. M. Wavefront Error Compensation Capabilities of Multiactuator Deformable Mirrors//SPIE Vol. 141, Adaptive Optical Components, 1978, p. 50-57), providing for the measurement of wavefront aberrations and the transformation of the results of these measurements into a set of commands for actuators that deform the mirror.

For assigning a set of commands to force actuators, Zernike polynomials are the most often used (Active Optics Correction Of Thermal Distortion Of A 1.8 Meter Mirror/E. Pearson, L. Stepp, J. Fox//Optical Engineering, 27(2), 115-122 (Feb. 1, 1988). Axial displacements of the mirror reflective surface arising during mirror deformation are represented as the superposition of Zernike polynomials.

It is known a method for compensating optical aberrations disclosed in U.S. Pat. No. 8,102,583 providing formation of a set of commands for force actuators that deform the mirror, in order to move the reflective surface of this mirror in accordance with the superposition of the Zernike polynomials that compensate said optical aberrations.

A drawback of the above-mentioned method is a limited compensation accuracy of the wavefront aberrations. It is due to the fact that the Zernike polynomials describe displacements of optical surfaces, while strain state of a mirror is three-dimensional. That is why it is impossible to provide the superposition of the Zernike polynomials on the reflective surface of the deformable mirror to compensate the wavefront aberrations exactly.

At the same time, there exists some analogy between the Zernike polynomials used in the theory of optical aberrations and the orthogonal Clebsch polynomials that are used in the theory of elasticity (Lemaitre G.bR. Astronomical Optics and Elasticity Theory//Active Optics Methods, Berlin, Heidelberg: Springer, 2009, 587 p.). But the Clebsch polynomials are used only to describe displacements of thin round homogeneous plates. In the case of deformation of mirrors the geometric shape of which is different from the above described, the Clebsch polynomials, and consequently, the Zernike polynomials neither are suitable to describe the deformations of a mirror.

It is known as well a method for compensating optical aberrations disclosed in the paper by Cho M. K. Active optics performance study of the primary mirror of the Gemini Telescopes Project//Optical Telescopes of Today and Tomorrow, SPIE Vol. 2871, 1997, p. 272-290, in which the commands are assigned to force actuators in a way to provide, on the deformable mirror reflective surface, some displacements corresponding to the superposition of mirror natural frequency modes required for compensating the wavefront aberrations. Thanks to the consideration of the real geometric shape of the mirrors, this method can improve the compensation accuracy in comparison with the method using the Zernike polynomials, but only in part, since the natural frequency modes of the mirror vibrations used by the method do not correspond to the orthogonal modes of the mirror deformation in the conditions of quasi-static loading implemented in active optical systems. The last phenomenon is explained by the fact that the natural frequency modes of the mirror depend on the real distribution of the mass in the volume of the mirror structure, while in the case of the quasi-static loading, the inertia-mass characteristics have no effect on the displacements induced by force actuators.

SUMMARY OF THE INVENTION

The technical result of the present invention is to improve the accuracy of compensation of the light beam wavefront aberrations in active optical systems.

This technical result is achieved by a method for compensating aberrations of an optical system with a deformable mirror, comprising the operations as follows:

(a) formation of a matrix N, binding the optical system aberrations with the displacements of the surface of a deformable mirror, presented as a superposition of natural frequency modes of a mirror simulator having the same geometric shape and the same elasticity characteristics as the deformable mirror but having zero density except for concentrated masses attached at points corresponding to the places of action of the force actuators onto the deformable mirror, that are taken into consideration only in the direction of application of forces or displacements deforming the mirror, and (b) formation of a matrix M, binding the coefficients of the natural frequency modes of the mirror simulator with the forces or displacements of the force actuators that deform the mirror;

(c) generation of a matrix of forces or displacements exerted on the deformable mirror on the basis of the aberration measurement results, using the matrices N and M.

A matrix F that is a matrix of forces or displacements exerted on the deformable mirror on the basis of the results of aberration measurements can be generated according to the formula:

$$F = M^{-1} \times (N^{-1} \times E)$$

where E is a matrix characterizing the output wavefront aberrations of the optical system.

A matrix F that is a matrix of forces or displacements exerted on the deformable mirror on the basis of the results of aberration measurements can be generated according to the formula:

$$F = M^{-1} \times ((N^T N)^{-1} N^T \times E)$$

where E is a matrix characterizing the output wavefront aberrations of the optical system.

A matrix F that is a matrix of forces or displacements exerted on the deformable mirror on the basis of the results of aberration measurements can be generated according to the formula:

$$F = M^{-1} \times (N^T (N N^T)^{-1} \times E)$$

where E is a matrix characterizing the output wavefront aberrations of the optical system.

DETAILED DESCRIPTION

The present invention implements the fact that the quasi-static loading of a real deformable mirror in an active optical system is entirely described by the superposition of orthogonal natural frequency modes of the mirror simulator, where the number of modes is equal to the number of acting forces or displacements exerted with force actuators. As a result, after executing a set of the commands which correspond to the superposition of these modes, no additional displacements arise on the reflective mirror surface that could distort the preset displacements or reduce the accuracy of compensating the wavefront aberrations.

The method for compensating optical aberrations of the present application is carried out as follows:

1. Initially, with the use of software and hardware, a mirror simulator is formed that has the same geometric shape and the same elastic properties as a deformable mirror but has zero density except for concentrated unit masses attached at points corresponding to the places of action of the force actuators onto the deformable mirror, that are taken into consideration only in the direction of application of forces or displacements deforming the mirror, and that is characterized:

by a set of natural frequency modes of vibrations;

by the matrix N that is a matrix of the sensitivity of the optical system aberrations to displacements of the reflective surface of the deformed mirror, presented as the superposition of natural frequency modes of the mirror simulator vibrations;

by the matrix M that is a matrix of the sensitivity of coefficients of natural frequency modes of the mirror simulator vibrations to the forces or displacements of actuators deforming the mirror.

With the help of the matrix N the aberrations of the optical system are connected to the displacements of the surface of the controlled mirror.

The elements of the matrix N are determined by optical modeling, for example by a numerical evaluation method of ray tracing with sequential ray tracing algorithms. In this case, a licensed software package ZEMAX is used.

The method of numerical modal analysis of a mirror simulator is used to determine the simulator natural frequency modes and a square matrix $M^1$ that is the reverse of the matrix of the sensitivity of coefficients of natural frequency modes of the simulator vibrations to forces or displacements provided by the force actuators. In this case, a licensed software package for finite-element analysis ANSYS is used. Each column of the matrix $M^1$ corresponds to one of the natural frequency modes of the mirror simulator vibrations. If the displacement values are assigned to force actuators as commands, the elements of this column are equal to displacements of the finite-element grid nodes determined in the modal analysis, at which concentrated unit masses are attached, in the direction of application of forces or displacements deforming the mirror. If forces are assigned as commands to actuators, the elements of this column represent products of the above-mentioned displacements by the square of natural circular frequency for the corresponding mode of vibrations.

2. Output wavefront aberrations of the optical system are measured by a wavefront detector 2 shown in FIG. 1, said aberrations being presented, for example, as a sum of the Zernike polynomials. The number of Zernike polynomials is infinite but for practical purposes, a limited number is taken, for example 32 polynomials. Then it is necessary to know 32 coefficients of these polynomials that have linear dimensions, for example in millimeters. These coefficients are determined by a wavefront detector 2. The coefficients form a matrix E under the form of a column vector.

Figure 1:
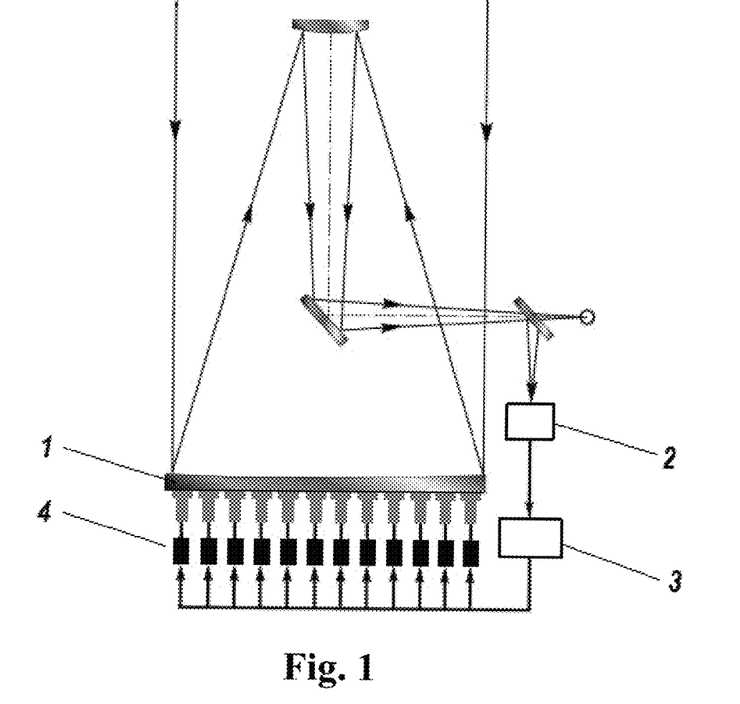
FIG. 1 shows an active optical system of a telescope with a deformable mirror 1 used to compensate aberrations. The telescope comprises as well a wavefront detector 2, software and hardware 3 comprising a mirror simulator, force actuators 4, for example, piezo-actuators.

3. The software and hardware comprising a mirror simulator 3 determine required displacements of the controlled mirror 1 surface, approximated by the superposition of natural frequency modes of the simulator vibrations. The number of these modes is equal to the number of forces or displacements provided by the force actuators. For assigning a specific distribution of the mirror surface displacements, it is necessary to know the coefficients for these modes. The natural modes are used in a non-dimensional form while the coefficients have the same linear dimension as the coefficients at the Zernike polynomials. Coefficients of natural frequency modes in the decomposition of the simulator vibrations form a matrix C that is a column vector.

If the number of natural modes is the same that the above mentioned number of Zernike polynomials, the resulting matrix N is square, according to the above given 32×32. If these numbers differ, the resulting matrix is not square. The elements of the matrix N can be any real numbers In the case when the number of measured parameters for the wavefront aberrations is equal to the number of natural frequency modes of the simulator vibrations, the matrix N inversion is carried out; in the case when the number of measured aberrations is less or more than the number of natural frequency modes of the simulator vibrations, the matrix N pseudo-inversion takes place. Respectively, the superposition of natural frequency modes of the mirror imitator vibrations on the basis of the results of measurement of the wavefront aberrations is determined as follows:

$$C = N^{-1} E,$$

or as follows:

$$C = (N^T N)^{-1} N^T E,$$

or as follows:

$$C = N^T (N N^T)^{-1} E,$$

where E is a column matrix of the parameters for the wavefront of aberrations, depending on what functions were used for the approximation of aberrations representing coefficients of the Zernike polynomials or differences of the optical path, or local slopes of the wavefront, or coefficients of the natural frequency modes of the simulator vibrations, or other parameters; C is a matrix of natural frequency modes of the mirror simulator vibrations; the upper index T defines the operation of matrix transposition.

4. The software and hardware containing a mirror simulator 3 determine the forces or displacements that deform the mirror, as a matrix F in accordance with the earlier obtained matrix C, defining the superposition of natural frequency modes of the deformable mirror simulator vibrations and of $M^1$, that represents a reverse matrix of the sensitivity for the coefficients of natural frequency modes to forces or displacements of force actuators and that is stored by the software and hardware:

$$i \quad F=M^{-1}C$$

5. The mirror is deformed by the force actuators 4 while using the obtained set of forces or displacements.

Figure 2:
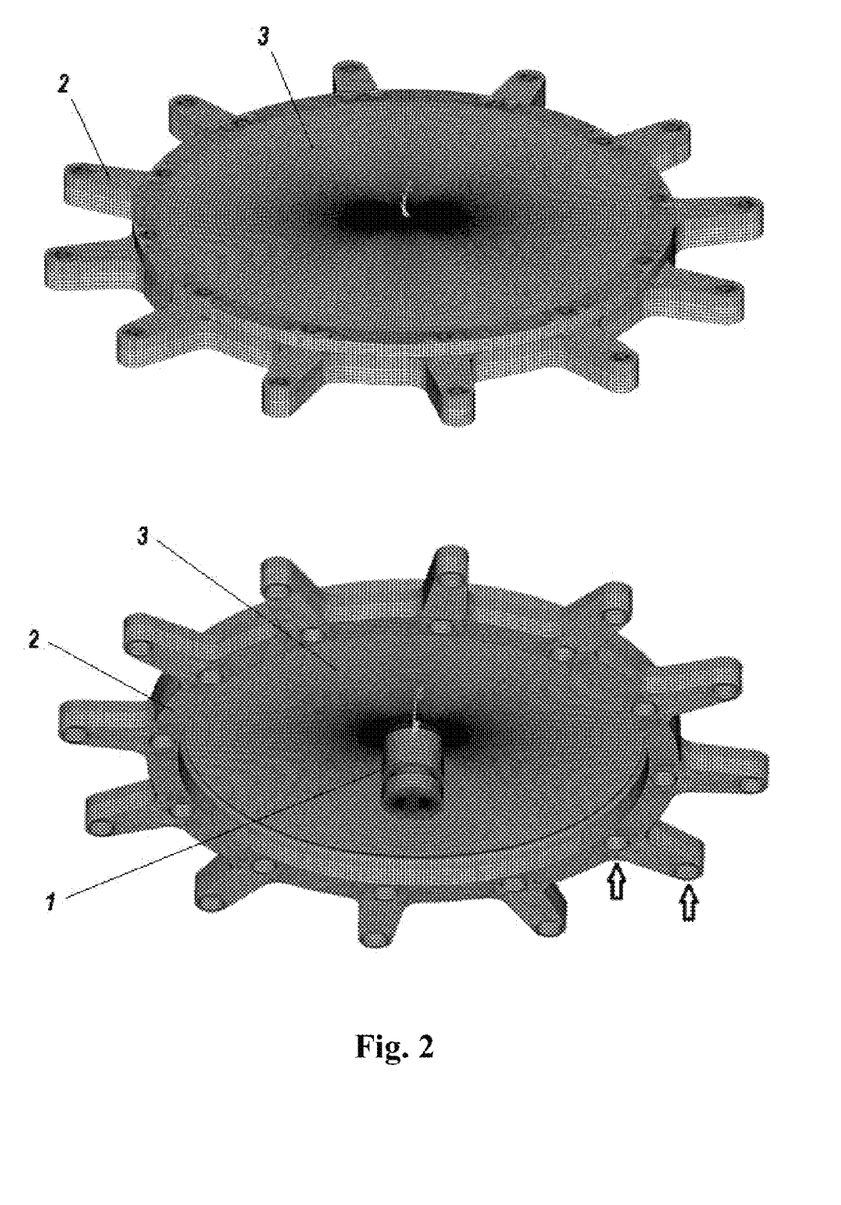
FIG. 2 shows a mirror used to substantiate that the superposition of orthogonal natural frequency modes of the mirror simulator vibrations entirely describes the quasi-static load of a real deformable mirror.
Figure 3:
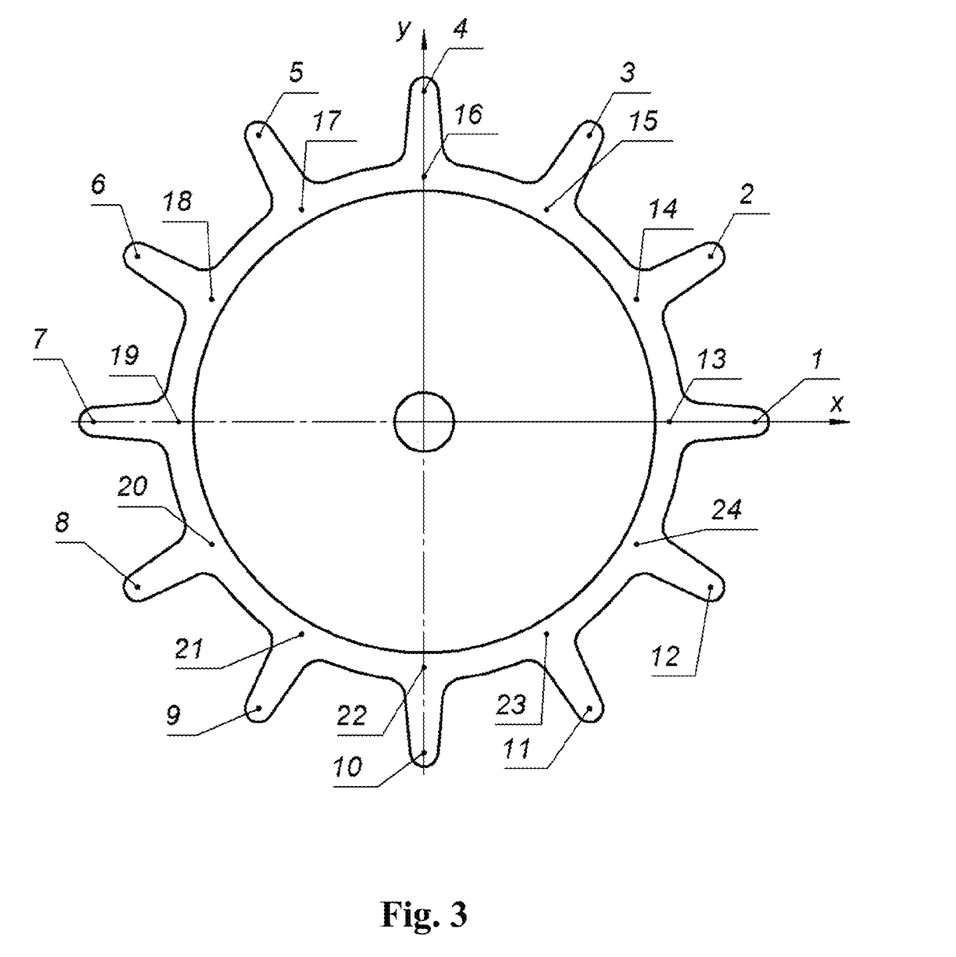
FIG. 3 shows the numeration of places for adjoining force actuators.

As an example, a mirror was considered having the structure in the shape of a vase, the finite-element model of which is shown in FIG. 2. The mirror is assembled: a central boss 1 and a ring with arms 2, made of invar are glued to a disk with the optical surface 3, made of glass ceramic. The central boss is fixedly attached. The mirror is loaded by 24 axial forces provided by force actuators. Holes for attaching mechanisms, arranged in pairs on 12 arms are illustrated by arrows in FIG. 2. Numeration of places of attachment is given in FIG. 3.

Figure 4:
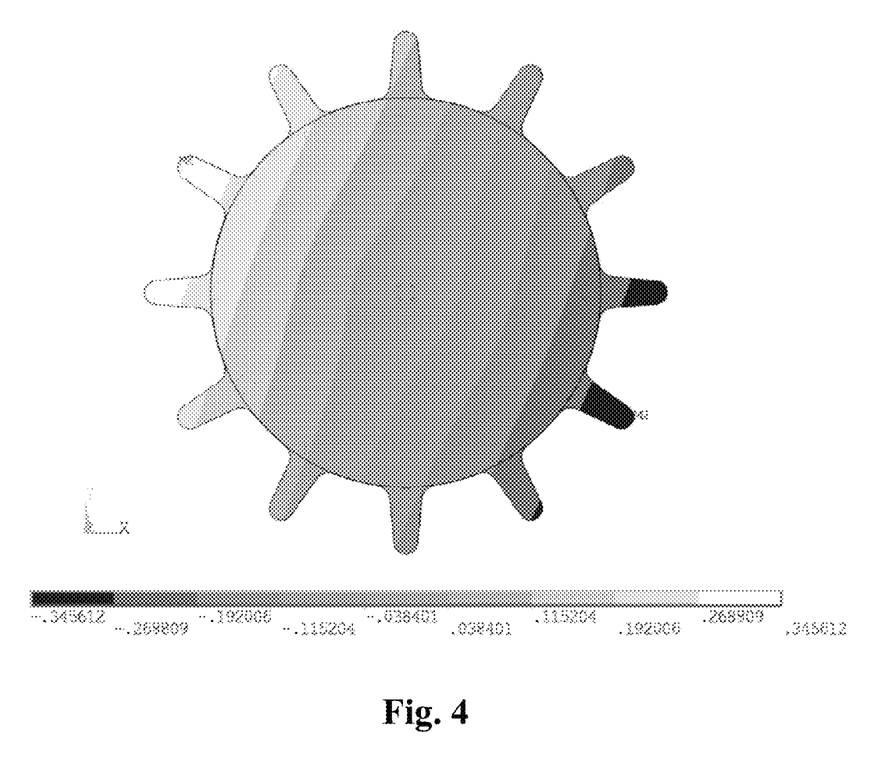
FIGS. 4 to 6 show contour lines of axial displacements of the deformed mirror surface corresponding to the natural frequency modes of the mirror simulator vibrations, respectively the first, 14th and 18th.
Figure 5:
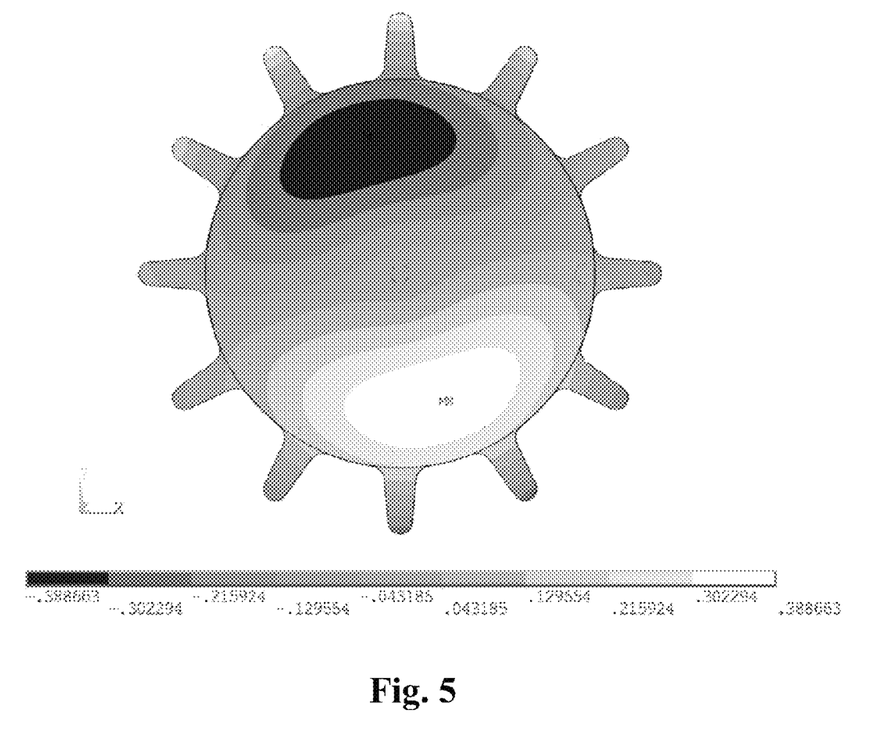
Figure 6:
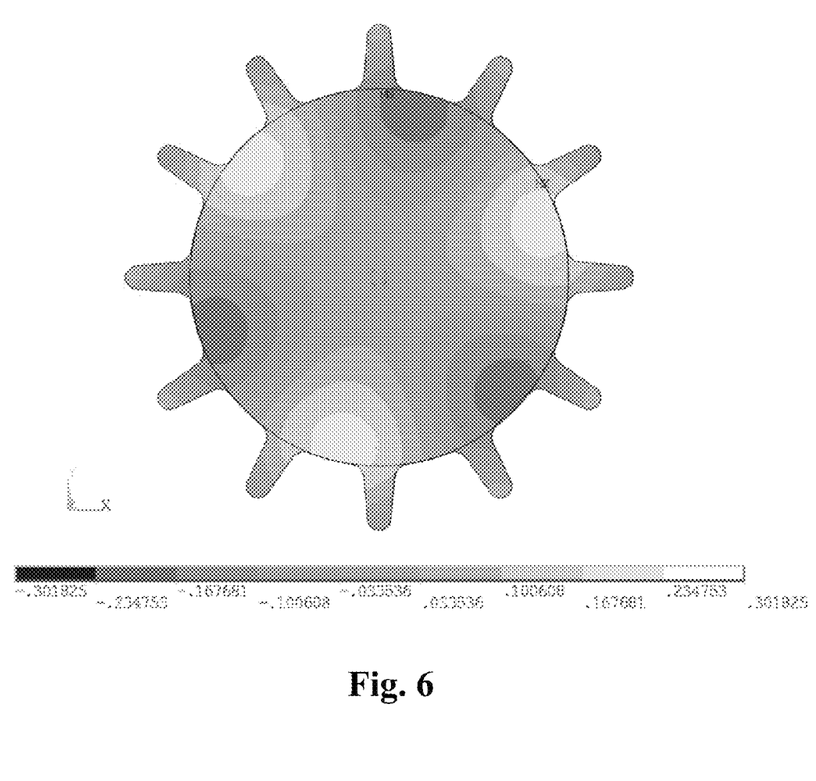

As illustrations, the contour lines of axial displacements of the deformable mirror optical surface for first, 14th and 18th natural frequency modes of the mirror simulator vibrations are given in FIGS. 4-6, respectively. The natural frequency for the mode 1 is 30.3852 Hz, for the mode 14 is 485.583 Hz, for the mode 18 is 757.419 Hz. The Figures show that the natural modes represent the particularities of the geometric shape of the mirror: the presence of a central boss and the location of arms.

Table 1 illustrates the elements of the first column of the matrix $M^{-1}$ for cases of assigning displacements and forces to force actuators.

TABLE 1

| | | First column of the matrix $M^{-1}$ | |
|---|---|---|---|
| Point | Node number | Control of displacements | Control of forces |
| 1 | 13429 | −0.26491 | −9655.62827 |
| 13 | 13469 | −0.18989 | −6921.27366 |
| 2 | 27123 | −0.32932 | −12003.1693 |
| 14 | 40521 | −0.23606 | −8604.02006 |
| 3 | 52634 | −0.30548 | −11134.4708 |
| 15 | 66032 | −0.21897 | −7981.32624 |
| 4 | 78145 | −0.19979 | −7282.29980 |
| 16 | 91543 | −0.14322 | −5220.04249 |
| 5 | 103656 | −0.40573E−01 | −1478.84249 |
| 17 | 117054 | −0.29083E−01 | −1060.05257 |
| 6 | 129167 | 0.12952 | 4720.86947 |
| 18 | 142565 | 0.92842E−01 | 3383.97757 |
| 7 | 154678 | 0.26491 | 9655.62827 |
| 19 | 168076 | 0.18989 | 6921.27366 |
| 8 | 180189 | 0.32932 | 12003.1693 |
| 20 | 193587 | 0.23606 | 8604.02006 |
| 9 | 205700 | 0.30548 | 11134.4708 |
| 21 | 219098 | 0.21897 | 7981.32624 |
| 10 | 231211 | 0.19980 | 7282.29980 |

TABLE 1-continued

| | | First column of the matrix $M^{-1}$ | |
|---|---|---|---|
| Point | Node number | Control of displacements | Control of forces |
| 22 | 244609 | 0.14322 | 5220.04249 |
| 11 | 256722 | 0.40573E−01 | 1478.84249 |
| 23 | 270120 | 0.29083E−01 | 1060.05257 |
| 12 | 282152 | −0.12952 | −4720.86947 |
| 24 | 294843 | −0.92842E−01 | −3383.97757 |

In the considered example, the needed 24 natural frequency modes of the mirror simulator vibrations for axial displacements of the optical surface multiplied by respective coefficients are represented by their root-mean-square values in the second column of Table 2.

TABLE 2

| | Root mean square of natural modes multiplied by coefficients, mm | |
|---|---|---|
| Mode number | Prescribed | Obtained at application of forces |
| 1 | 1.30139959E−03 | 1.30139959E−03 |
| 2 | 1.81674515E−04 | 1.81674515E−04 |
| 3 | 1.77422624E−04 | 1.77422624E−04 |
| 4 | 2.41968253E−04 | 2.41968253E−04 |
| 5 | 2.37832028E−04 | 2.37832028E−04 |
| 6 | 2.93388648E−06 | 2.93388648E−06 |
| 7 | 4.41407790E−05 | 4.41407790E−05 |
| 8 | 2.47476346E−05 | 2.47476346E−05 |
| 9 | 2.40836713E−05 | 2.40836713E−05 |
| 10 | 1.21941986E−06 | 1.21941986E−06 |
| 11 | 1.04427891E−06 | 1.04427891E−06 |
| 12 | 3.93603627E−10 | 3.93603628E−10 |
| 13 | 1.81039839E−04 | 1.81039839E−04 |
| 14 | 1.32005936E−03 | 1.32005936E−03 |
| 15 | 1.74456591E−04 | 1.74456591E−04 |
| 16 | 1.46707436E−04 | 1.46707436E−04 |
| 17 | 7.01018222E−05 | 7.01018222E−05 |
| 18 | 6.82214388E−06 | 6.82214388E−06 |
| 19 | 3.40293990E−06 | 3.40293990E−06 |
| 20 | 4.03222156E−07 | 4.03222156E−07 |
| 21 | 1.89622175E−06 | 1.89622175E−06 |
| 22 | 4.18924199E−07 | 4.18924199E−07 |
| 23 | 1.50015908E−06 | 1.50015908E−06 |
| 24 | 3.30165537E−10 | 3.30165539E−10 |

Table 3 gives the forces found in accordance with the relationship (3).

TABLE 3

| Force number | Force, N |
|---|---|
| 1 | 21.58246324 |
| 2 | 22.62798289 |
| 3 | 7.873509662 |
| 4 | 11.80896372 |
| 5 | 2.46125139 |
| 6 | −7.965528332 |
| 7 | −2.602475619 |
| 8 | −6.978432007 |
| 9 | −15.9334173 |
| 10 | −6.767859234 |
| 11 | −5.888897748 |
| 12 | −5.231199841 |
| 13 | −17.19006065 |
| 14 | −26.02863542 |
| 15 | −24.04734848 |
| 16 | −7.657331756 |
| 17 | −1.160097989 |
| 18 | 4.115367578 |

TABLE 3-continued

| Force number | Force, N |
|---|---|
| 19 | 8.759042553 |
| 20 | 12.21508684 |
| 21 | 13.43810732 |
| 22 | 17.22602362 |
| 23 | 11.97534719 |
| 24 | −8.096216319 |

Figure 7:
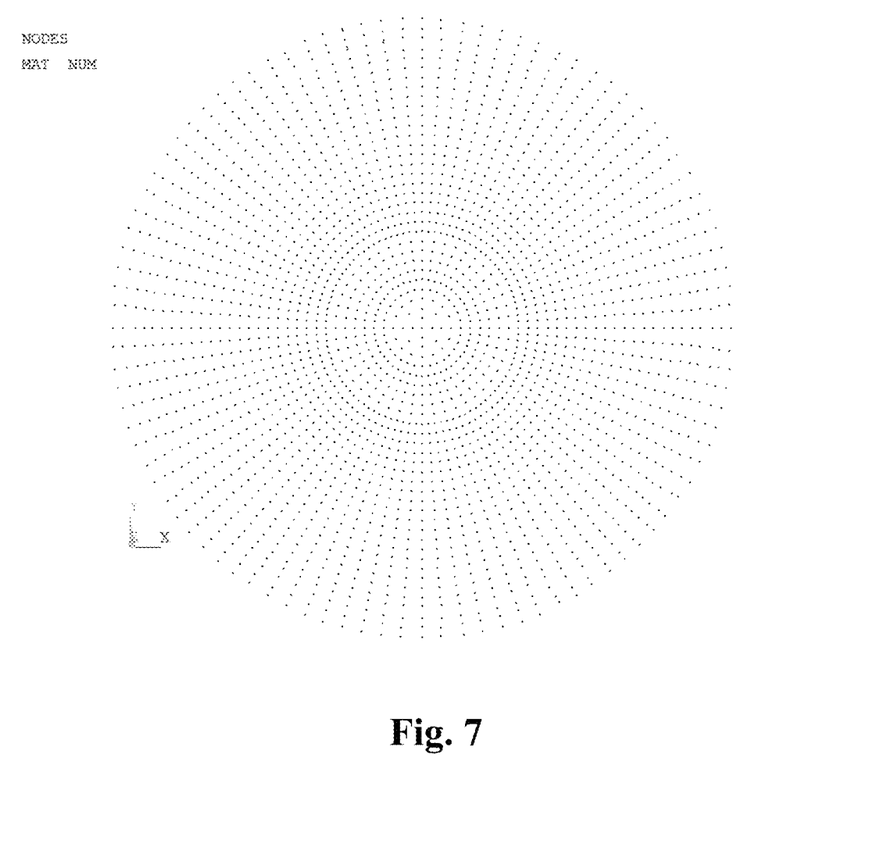
FIG. 7 provides nodes of a finite-element grid on the optical surface of the mirror, used for approximation with natural frequency modes.

Then, to check the results obtained, the finite-element method was used to calculate the displacements of the real mirror optical surface nodes under the effect of forces found, and to approximate them by natural frequency modes of the imitator. FIG. 7 shows nodes of a finite-element grid on the mirror optical surface used for approximation with natural modes. The error of approximation is within machine precision. It means that no additional displacements appeared on the reflective surface that could distort the displacements assigned. The results of the finite-element method calculations are given in the third column of Table 2. As we see, the prescribed superposition of the natural frequency modes of the mirror simulator vibrations on a controlled deformable mirror with an error that is within machine precision.

The given example confirms that the superposition of orthogonal natural frequency modes of the mirror simulator vibrations entirely describes the quasi-static loading of a real deformable mirror under the effect of force actuators. So, the method of the present application enables to eliminate the part of the error of compensation of the active optical system aberrations that is related to the formation of the superposition of modes on the reflective surface of the deformable mirror, needed to compensate wavefront aberrations.

The invention claimed is:

1. Method for compensating aberrations of an active optical system by a deformable mirror, comprising the operations as follows:
  (a) formation of a matrix N, binding the optical system aberrations with the displacements of the surface of a deformable mirror, presented as a superposition of natural frequency modes of a mirror simulator having the same geometric shape and the same elasticity characteristics as the deformable mirror but having zero density except for concentrated masses attached at points corresponding to the places of action of the force actuators onto the deformable mirror, that are taken into consideration only in the direction of application of forces or displacements deforming the mirror;
  (b) formation of the matrix M, binding the coefficients of the natural frequency modes of the mirror simulator with the forces or displacements of the force actuators that deform the mirror;
  (c) generation of the matrix of forces or displacements for loading the deformable mirror on the basis of the aberration measurement, using the matrices N and M.

2. Method of claim 1, characterized in that the matrix F of forces or displacements for the deformable mirror is generated according to the formula:

$$F = M^{-1} \times (N^{-1} \times E)$$

where E is a matrix characterizing the output wavefront aberrations of the optical system.

3. Method of claim 1, characterized in that the matrix F of forces or displacements for the deformable mirror is generated with the use of results of aberration measurements according to the formula:

$$F = M^{-1} \times ((N^T N)^{-1} N^T \times E)$$

where E is a matrix characterizing the output wavefront aberrations of the optical system.

4. Method of claim 1, characterized in that the matrix F of forces or displacements for the deformable mirror is generated with the use of results of aberration according to the formula:

$$F = M^{-1} \times (N^T (N N^T)^{-1} \times E)$$

where E is a matrix characterizing the output wavefront aberrations of the optical system.

* * * * *